United States Patent [19]
Furukawa et al.

[11] Patent Number: 5,475,973
[45] Date of Patent: Dec. 19, 1995

[54] ROPE WITH CORROSION RESISTANCE AND BENDING ENDURANCE CHARACTERISTICS

[75] Inventors: Hiroaki Furukawa, Takarazuka; Sadahiro Onimaru, Mino; Yukio Narita, Sanda, all of Japan

[73] Assignee: Nippon Cable System Inc., Takarazuka, Japan

[21] Appl. No.: 316,379

[22] Filed: Sep. 30, 1994

Related U.S. Application Data

[63] Continuation of Ser. No. 994,981, Dec. 22, 1992, abandoned.

[30] Foreign Application Priority Data

| Dec. 27, 1991 | [JP] | Japan | 3-346081 |
| Dec. 27, 1991 | [JP] | Japan | 3-346082 |
| Nov. 19, 1992 | [JP] | Japan | 4-310395 |
| Nov. 19, 1992 | [JP] | Japan | 4-310396 |

[51] Int. Cl.⁶ ............................ D02G 3/38; D02G 3/40
[52] U.S. Cl. .................. 57/232; 57/211; 57/212; 57/214; 57/218; 57/241
[58] Field of Search .............. 57/211, 212, 214, 57/217, 218, 221, 232, 241

[56] References Cited

U.S. PATENT DOCUMENTS

| 2,509,894 | 3/1950 | Toulmin et al. | 57/221 X |
| 3,130,536 | 4/1964 | Peterson et al. | 57/161 |
| 3,240,570 | 3/1966 | Grimes et al. | 57/217 |
| 3,307,343 | 3/1967 | Gilmore et al. | |
| 3,778,994 | 12/1973 | Humphries | 57/214 |
| 4,197,695 | 4/1980 | Hughes et al. | 57/217 X |
| 4,651,513 | 3/1987 | Dambre | 57/217 |

FOREIGN PATENT DOCUMENTS 1017077  1/1966  United Kingdom.

OTHER PUBLICATIONS

Feyrer, Klaus, Abstract of "Statistical evaluation of the results of wire rope bending tests—part II", Wire 31 (1981) 4, pp. 158–162.

Patent Abstracts of Japan, vol. 14, No. 514, Nov. 13, 1990 & JP-A-22 12 616.

*Primary Examiner*—Daniel P. Stodola
*Assistant Examiner*—William Strysewski
*Attorney, Agent, or Firm*—Armstrong, Westerman, Hattori, McLeland & Naughton

[57] ABSTRACT

A rope comprising a plurality of wires (2, 3, 4) made of a steel wire being twisted together; at least the wires which are arranged in such a manner as to be disposed on an outer surface of the rope (1) being made of a plated steel wire wherein a corrosion resistance is superior; at least said wires which are located in a center of the rope not being made of the wire wherein the corrosion resistance is superior.

15 Claims, 11 Drawing Sheets

FIG.11(A)
FIG.11(B)
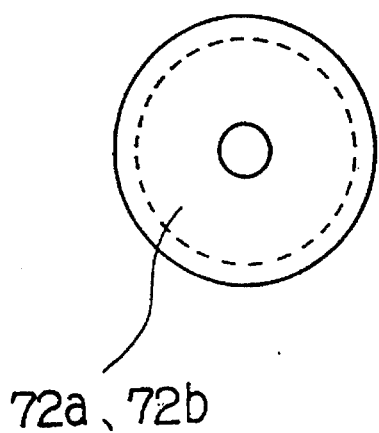
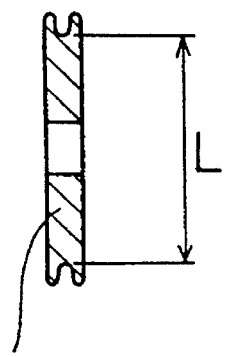
72a、72b
72a、72b
FIG. 12
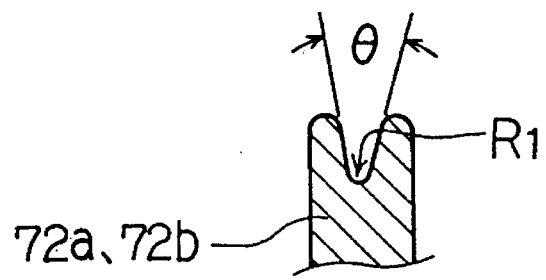
72a、72b 76a, 76b 76a, 76b 76a, 76b

ROPE WITH CORROSION RESISTANCE AND BENDING ENDURANCE CHARACTERISTICS

This application is a continuation of application Ser. No. 07/994,981 filed Dec. 22, 1992, now abandoned.

BACKGROUND OF THE INVENTION

The present invention relates to a rope for operating (hereinafter referred to as a rope) particularly, this invention relates to a rope wherein a corrosion. More resistance is improved without lowering its durability for bending and a rope wherein the corrosion resistance is remarkably improved, each of which is preferably used for many technical fields such as a window regulator for an automobile.

A rope is generally produced by stranding a plurality of wire or by stranding a plurality of the rope (in this case the rope is called a strand). Such rope is sometimes corroded by, for example, water containing salt.

In order to prevent the rope from being corroded, the ropes mentioned hereinafter are proposed.

(a) A steel wire plated with zinc is drawn to obtain a wire for a rope. A plurality of the wires are stranded with each other and plated with tin to obtain a wire rope (Japanese Examined Utility Model Publication No. 25500/1979).

(b) A steel wire plated with nickel or nickel alloy is plated with zinc or zinc alloy and is plated with tin or tin alloy on the zinc or the zinc alloy layer. Thus, what is obtained is a steel wire which is drawn and plurality of the steel wires are twisted to obtain a rope (Japanese Examined Utility Model Publication No. 10332/1990).

(c) Steel wires plated with zinc-aluminum alloy are drawn and stranded with other to obtain an inner core for a control cable (Japanese Unexamined Patent Publication No. 212616/1990).

The above-mentioned ropes and the inner cable for a control cable have an anti-corrosion property which has been improved as compared with a normal rope plated with zinc. However, with respect to the wire rope described in (a), the wire must be plated before a step for drawing a wire rod and after the step for stranding the wire, and a step for stranding the wire should be required. For that reason, a number of producing steps becomes rather numerous so that the cost for producing the wire rope is high.

With respect to the rope described in (b), three kinds of plating steps are required for producing the rope. Accordingly, producing steps increase remarkably.

With respect to the inner cable for the control of the wires is plated cable described in (c), each of the wires is plated with zinc-aluminum alloy. Accordingly, the cost for producing the inner cable is high.

On the other hand, for the purpose of improving the durability on bending fatigue of the rope, generally a diameter of the wire is made small in order to decrease the bending stress. Thereof, a tension strength is lowered due to the reduced diameter of a wire. In order to decrease the tension stress, the number of the wire is increased.

As the rope wherein means for improving the durability on bending fatigue is employed, the rope wherein a plurality of side strands are arranged around a core strand having a diameter larger than that of the side strand in such a state that the side strands are closed together is known as disclosed in Japanese Unexamined Utility Model Publication No. 64796/1987.

Further, the conventional rope has been closed in such manner that a tightening percentage is approximately in the range of 0 to 2% in order to prevent the wire from damaging when the strand is twisted. Researching the tightening percentage of available ropes for operating, the result was found that each tightening percentage of the ropes was in the range of 0 to 2%. In other words each tightening percentage was rather small.

Besides, the tightening percentage used in the specification for instance, with respect to the rope having 19+8×7 construction shown in FIG. 7 is obtained as follows:

$$\text{tightening percentage} = \frac{\substack{\text{calculated} \\ \text{diameter} \\ \text{of a rope}} - \substack{\text{measured} \\ \text{diameter} \\ \text{of a rope}}}{\text{calculated diameter of a rope}} \times 100,$$

where the calculated diameter is a sum of outer diameter of each wire and the measured diameter is a value which is obtained by measuring the diameter of a circumscribed circle of the rope.

Furthermore, it has been said that durability on fatigue property is improved when preforming is performed to the side strand so that a preforming percentage which is obtained by dividing the measured diameter into a wave diameter when the rope is loosed can be approximately in a range of 95 to 100% (page 185 of "a hand book of a wire rope" (Oct. 15, 1967) edited by the committee for editing a handbook of a wire rope published by Hakua Shobo).

As mentioned above, the rode having a stranded construction of, such as, the conventional rope wherein a plurality of strands are stranded is generally closed so that the tightening percentage is in a range of 0 to 2% and the preforming percentage is in a range of 95 to 100%.

Besides, the tightening percentage can be obtained by following former (1) with respect to the rope having 19+8×7 construction as shown in FIG. 7.

$$\text{tightening percentage} = \frac{\{(a + 2b_1 + 2b_2) + 2(c + 2d)\} - D}{(a + 2b_1 + 2b_2) + 2(c + 2d)} \times 100 \quad (1)$$

a: outer diameter of the core wire 43 of the core strand, $b_1$: outer diameter of the first side wire 44 of the core strand, $b_2$: outer diameter of the second side wire 45 of the core strand, c: outer diameter of the core wire 47 of side strand, d: outer diameter of the side wire 48 of side strand, D: measured outer diameter of rope 41.

Further, with respect to the wire having W(19)+8×7 construction wherein the core strand is stranded so as to have a Warrington type parallel lay strand as shown in FIG. 8, the tightening percentage is obtained by following formula (2)

$$\text{tightening percentage} = \frac{\{(a + 2b_1 + 2b_2) + 2(c + 2d)\} - D}{(a + 2b_1 + 2b_2) + 2(c + 2d)} \times 100, \quad (2)$$

where a: outer diameter of the core wire 53 of the core strand, $b_1$: outer diameter of the first side wire 54 of core strand, $b_2$: outer diameter of the second side wire 56 of core strand, c: outer diameter of the core wire 58 of the side strand, d: outer diameter of the side wire 59 of the side strands, and D: measured outer diameter of the rope 51.

On the other hand, the tightening percentage of a rope having 7×7 construction as shown in FIG. 9 can be obtained by following formula.

$$\frac{\text{tightening}}{\text{percentage}} = \frac{a + 2b + 2c + 4d - D}{a + 2b + 2c + 4d} \times 100, \quad (3)$$

where a: outer diameter of the core wire 73 of the core strand,
b: outer diameter of the side wired 64 of the core strand,
c: outer diameter of the core wire 66 of the side strand,
d: outer diameter of the side wire 67 of the side strand, and
D: measured outer diameter of the rope 61.

Next, the preforming percentage φ is obtained by following formula (4).

$$\phi = \frac{T}{D} \times 100 \ (\%), \quad (4)$$

where

D: measured outer diameter of a rope as shown in FIG. 16 (A), and

T: wave diameter when the wire is loosed as shown is FIG. 16 (B).

However, in the conventional rope, the tightening percentage is small and the preforming percentage large; that is, in this rope each strand is not stranded so tightly and the rope which is not closed so tightly is subject to deformation in the radial direction of the rope when the rope is used in such a portion that the rope is bent while the rope is slid, for instance in a guide which cannot rotate. Accordingly, there is such a problem that the durability on bending fatigue is low, since the wire is subjected to secondary bending i.e. the wire is subjected to local bending due to an external pressure whereby the wire is pressed against the layer of the wires located innerly.

The object of the present invention is to provide a rope having the same corrosion resistance as that of the conventional wire rope wherein wire employs a steel wire by virtue of using a steel superior corrosion resistant wire for the the specific wire, the corrosion resistance of which is superior, and a rope wherein the endurance property for bending is superior and a cost for producing the wire is lowered. Further, another object of the present invention is to provide a rope wherein the endurance property for bending fatigue when the wire is subjected to bonding in sliding movement is remarkably improved, by virtue of specifying the the tightening percentage and the preforming percentage.

SUMMARY OF THE INVENTION

A first aspect of the present invention is a rope for operating comprising: a plurality of wires made of a steel wire being twisted together; at least the wires which are arranged in such a manner as to be disposed on an outer surface of the rope being made of a steel wire wherein a corrosion resistance is superior; at least the wire which is located in a center of the rode not being made of the wire wherein the corrosion resistance is superior.

For instance, when the rope for operating is a spiral rode composed of a single layer or a plurality of layers and each layer is composed of a plurality of wires and the wires are twisted each other, an outermost layer is composed of the wires made of a steel wire wherein the corrosion resistance is superior, or when the rode for operating is a stranded wire wherein a plurality of strands composed of a plurality of wires and the wires are stranded and the strands are closed each other, side strands are composed of the steel wire wherein a corrosion resistance is superior.

Besides, as the steel wire wherein the corrosion resistance is superior, such a wire that the wires arranged in the outermost layer are plated with zinc-aluminum alloy and another wires may be plated with zinc.

As the rope for operating having the stranded construction, the rope having 7×7 construction wherein a tightening percentage is in the range of 2.5 to 8%, or the rope having 19+8×7 construction or (parallel lay strand)+8×7 construction wherein the tightening percentage is in the range of 4 to 11% and the preforming percentage is in the range of 65 to 90% as mentioned hereinafter.

A second aspect of the present invention is a rope for operating composed of a plurality of strands, each of which are composed of a plurality of stranded wires. The rope is characterized in that the tightening percentage is in the range of 4 to 11% and the preforming percentage is in the range of 65 to 90%.

In the first aspect of the rope of the present invention, steel wires wherein a corrosion resistance is superior are arranged in the outermost layer of the rope. As the above-mentioned wire, the wire which in disposed on the surface thereof is provided with a layer of the steel wire plated with zinc-aluminum alloy. With respect to the layer the zinc-aluminum alloy, the corrosion resistance is far better than that of the conventional layer composed of the steel wire plated with zinc. For This reason, the wire of the present invention can be sufficiently used for a long interval.

However, the cost for plating the wire with the alloy having the corrosion resistance which is superior, such as zinc-aluminum alloy, is high, comparing with the conventional zinc plating. Accordingly, if all wires composing of a rope are plated with the alloy having the corrosion resistance which is superior, the rope is very expensive. If in all the wires of the rope, such a steel wire wherein the corrosion resistance is superior while an endurance property for bending is inferior is employed, the rope is not preferable to the use which is easily subjected to bending.

When the outermost layer is composed of the steel wires plated with the alloy having superior corrosion resistance as the rope of the present invention, the same corrosion resistance property as that of the rope wherein all the wires are plated with the alloy having superior corrosion resistance can be obtained. The cost for producing the rope of the present invention is far smaller than that of the conventional rope. Further, the steel wires wherein the corrosion resistance is superior while the endurance property for bending is inferior are employed only in the outermost layer of the wire wherein the corrosion resistance is inferior while the endurance property for bending is superior is employed in the other layers. Thereby, the rope wherein the corrosion resistance and the endurance property for bending are superior can be produced.

The above-mentioned aluminum is a component which contributes to the superior corrosion resistance in a metal plating layer. If desired, a bit of silicon, magnesium, sodium, Mischmetal or the like may be added.

When weight percentage of the aluminum in the metal plating layer exceeds 10% by weight, the corrosion resistance is lowered. On the contrary, even in the case that the weight percentage is less than is 1%, the corrosion resistance is reduced.

For this reason, the weight percentage of the aluminum is preferably in the range of 1 to 10% by weight, and more preferably in the range of 4 to 5% by weight.

Composition of the metal plating layer is substantially the same as that of plating bath to be used. Accordingly, the composition of the metal plating layer can be adjusted by adjusting the composition of the plating bath.

A deposit weight of the metal plate is preferably more than 15 g/m² in order to obtain a rope maintains the corrosion resistance in the state wherein the rope is completed.

When the rope is obtained by stranding the wires which are obtained by drawing the plated wire, the deposit weight on the surface of the wire rod should be more than 100 g/m² in order to maintain the above-mentioned deposit weight of 15 g/m² in the state wherein the rope is completed. Further, the deposit weight is preferably less than 400 g/m² in order that the plated thick wire (or wire rod) can be suitably drawn.

In the present invention, a way wherein, the wire of the rope is plated with zinc-aluminum alloy is not limited to the specific way. However, for instance, there is a way wherein the steel wire is dipped (or immersed) in the plating bath which is mixed with melted aluminum, and the steel wire is drawn. Besides, the above-mentioned plating bath is used when the steel wire is normally plated with zinc by means of hot dipping.

In the above manner, when a content of aluminum in the plating bath is 5% by weight, eutectic point is obtained and homogeneous eutectic structure can be obtained.

The wires plated with zinc-aluminum alloy are in the specific location stranded each other as mentioned hereinafter so that the rope can be produced. Thus produced rope has superior corrosion resistance.

Accordingly, the rope can be used for a long interval.

Besides, as an embodiment of the steel wire having superior corrosion resistance, the steel plated with zinc-aluminum alloy is explained as mentioned hereinbefore. However, the steel wire is not limited to the steel wire plated with zinc-aluminum alloy. For instance, the steel plated with zinc-nickel alloy or stainless steel wire and the like can be employed.

In the second aspect of the rope of the present invention, the rope is more firmly closed than the conventional rope since the tightening percentage of the rope in accordance with the present invention is large. Accordingly, deformation in the radial direction can be prevented from generating so that secondary bending in the wire is not easily generated. Further, since the preforming percentage is small, the side strands of the rope which are closed is subjected to the force directed toward a center of the rope. Accordingly, the deformation in the radial direction can be prevented from generating and the secondary bending of the wire is not easy to be generated.

Accordingly, the rope of the present invention, durability on bending in sliding movement is improved.

BRIEF EXPLANATION OF THE DRAWINGS

FIGS. 11(A) and 11(B) are explanatory drawings of the roller

FIG. 12 is an explanatory drawings of the roller used in the apparatus of FIG. 10;

DETAILED DESCRIPTION

In the present invention, a rope having for instance a shape in section shown in FIGS. 1 to 9. The present invention is not limited to the above shapes.

In FIG. 1 to 6, wires shown in double circle are steel wires having superior corrosion resistance.

Figure 1:
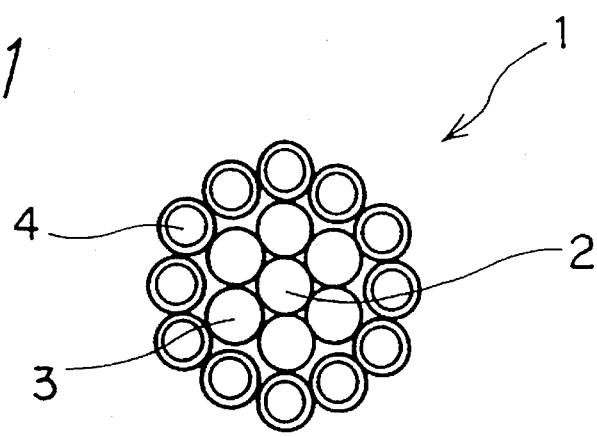
FIG. 1 is a cross-sectional view of an embodiment of a rope of a first aspect in accordance with the present invention.

A rope 1 in FIG. 1 is an example of a spiral rope having a single layer or several layers, and each of which is composed of a plurality of the wires. The rope 1 is obtained by twisting the wires each other. The spiral rope is formed by twisting six wires 3 defining a first layer arranged around a core wire 2, and twisting twelve wires 4 defining a second layer arranged around the first layer. The superior corrosion resistance steel wires are used for the wires 4 of the second layer.

Figure 2:
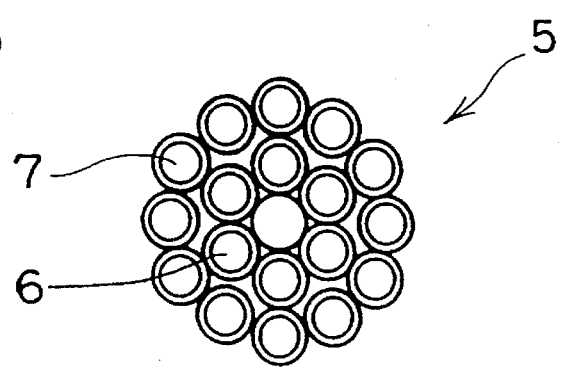
FIG. 2 is a cross-sectional view of another embodiment of the rope of the first aspect in accordance with the present invention.

A rope 5 shown in FIG. 2 is the same that of FIG. 1 except that the superior corrosion resistant steel wires are used for not only wires 7 of the second layer but also the wires 6 of the first layer.

Figure 3:
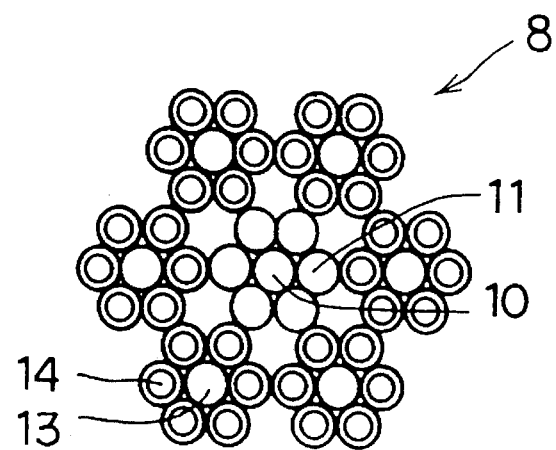
FIG. 3 is a cross-sectional view of yet another embodiment of the rope of the first aspect in accordance with the present invention.

A rope shown in FIG. 3 has so-called a 7×7 construction. That is, a core strand 9 is defined by stranding six side wires 11 arranged around a core wire 10, a side strand 12 is defined by stranding six side wires 14 arranged around a core wire 13, and a stranded rope is obtained by closing the six side strands 12 arranged around the core strand 9. Besides, the superior corrosion resistant steel wires are used for the side wire 14 of the side strand 12.

Figure 4:
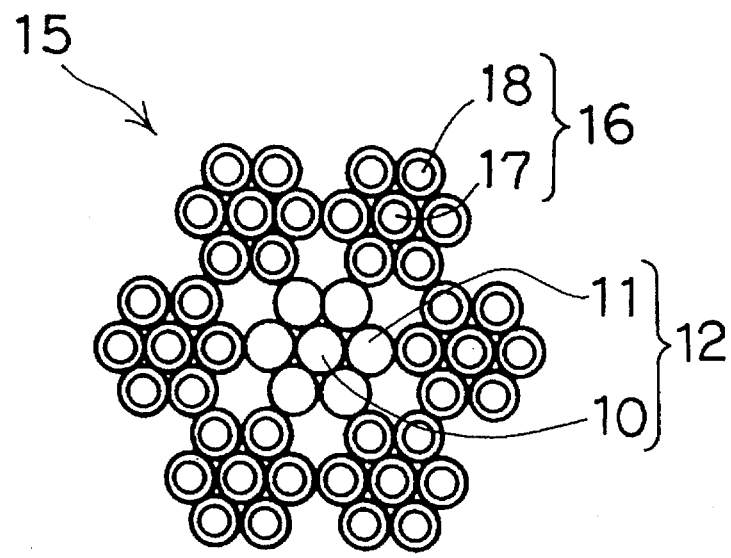
FIG. 4 is a cross-sectional view of yet another embodiment of the rope of the first aspect in accordance with the present invention.

A rope 15 shown in FIG. 4 is the same as that of FIG. 3 except that the superior corrosion resistant steel wire is used for the core wire 17 of the side strands 16.

Figure 5:
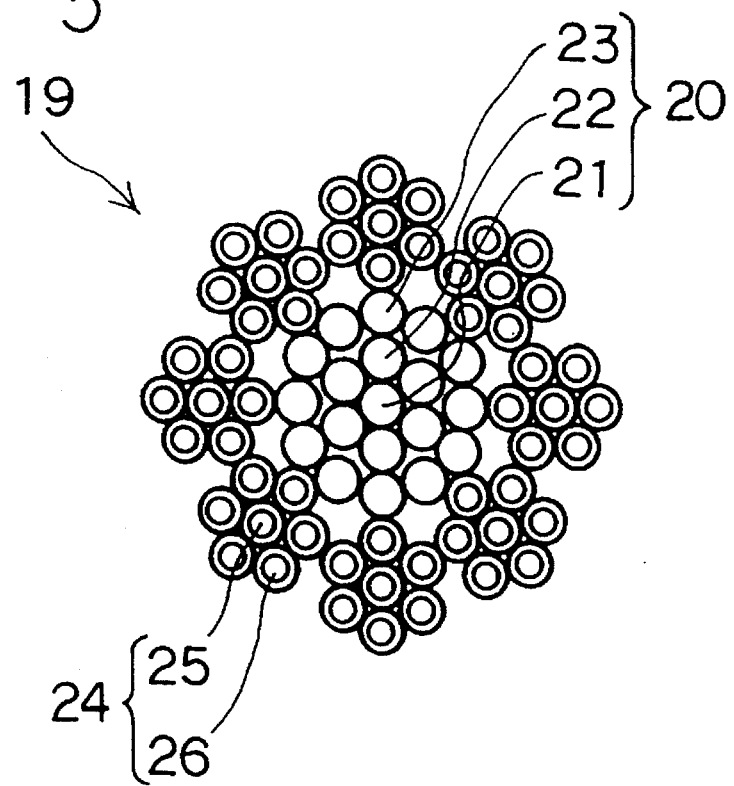
FIG. 5 is a cross-sectional view of yet another embodiment of the rope of the first aspect in accordance with the present invention.

A rope shown in FIG. 5 has a so-called 19+8×7 construction. That is, a core strand 20 is defined by stranding six first side wires 22 arranged around a single core wire 21 and stranding twelve second side wires arranged around the six side wires, and a side strand 24 is defined by stranding six side wires 26 arranged around a single core wire 25. The rope 19 having a stranded construction is obtained by closing eight pieces of the side strands 24 arranged around the core strand 20. Besides, the arranged around the resistance steel wire is used for the core wire 25 and the side wires 26 of the side strands 24.

Figure 6:
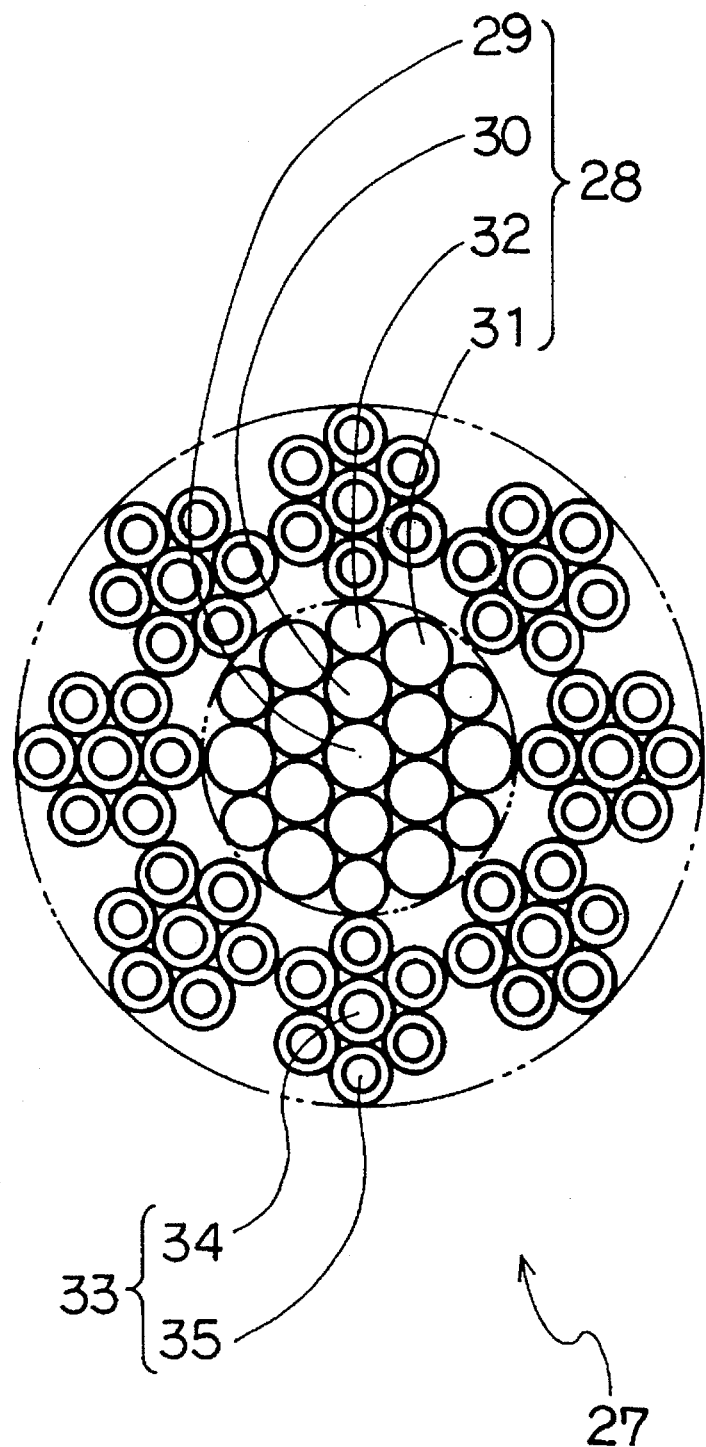
FIG. 6 is a cross-sectional view of yet another embodiment of the rope of the first aspect in accordance with the present invention.

The rope shown in FIG. 6 has the 19+8×7 construction. However, wires are stranded in the core strand 28, such that the core strand 28 has a parallel lay construction. In other word, the core strand 28 is stranded in such a way that each wire of the core strand is linearly contacted with the other. The parallel lay strand is a type of stranding wires having different outside diameter in the strand. In accordance with the parallel lay strand, each layer of the rope 27 has the same pitch for stranding and the same direction of stranding. When the wires are stranded in the above way, each wire of the second layer (the outer layer) is engaged into a groove defined by the adjoining wires of the first layer (inner layer), one wire being in substantially linear contact with the other wire without crossing each other. As a result, the strand is firmly stranded and the deformation in the radial direction does not happen easily. An internal abrasion in the strand due to a friction between the wires is low and a fatigue due to a secondary bending of wires is not generated. Then, the rode shown in FIG. 6 has superior properties.

The rode 27 shown in FIG. 6 has (parallel lay strand)+8×7 construction. As the parallel lay strand, a core strand 28 having a Warrington type strand construction is used. In other words, the rode 27 has a W(19)+8×7 construction. With respect to the warrington strand, a difference between the maximum diameter and the minimum diameter in the wires of the core strand is the smallest in the strands having parallel lay strand construction composed of 19 pieces of the wires. For that reason, the rode 27 is suitable for the strand having small diameter.

More particularly, 6 pieces of first side wires 30 defining a first layer are arranged around a core wire 29 and a diameter of the first side wire 30 is somewhat smaller than that of the core wire 29. Each of 6 pieces of third side wires 31 having the same diameter as that of the core wire is arranged in the groove defined by the adjoining first side wires 30 and each of six pieces of second side wires 32 is arranged around the first layer in such a way as to be along with the first side wire 30. A diameter of the second side wire 32 is still smaller than that of the first side wire. Further, the above-mentioned side wires are stranded at the same time in such a way that each layer has the same Ditch and in the same direction. Thus, the core strand 28 is formed. Besides, diameter of each wire of the core strand is not limitted to the diameter mentioned hereinbefore. In short, diameter of each wire of the core strand is suitably selected so that each wire can be linearly contacted each other when each wire is stranded in the same pitch and in the same direction.

Further, 8 pieces of side strands 33 are obtained by stranding 6 pieces of side wires 35 around a core wire 34. The superior corrosion resistant steel wire is used for the core wire 34 and the side wire 35 of the side strands 33.

Next the rope of the present invention is explained more particularly on the basis of the concrete example. Besides, in the following example 1 and comparative examples 1 to 3, the above-mentioned rope having strand construction of 7×7 construction is used.

EXAMPLE 1

A wire rod having an outer diameter of 1.05 mm as a wire for a core strand was obtained by immersing a steel wire (material: JIS G 3506, SWRH 62A) into a plating bath composed of zinc being in the condition wherein temperature is in the range of 430° to 480° C. The deposit weight in the specific area was 150 g/m$^2$.

Further, as the wire for the side strand the wire rod was obtained by the same way as that of the above-mentioned wire for the core strand except that the plating both composed of 4% by weight of aluminum and 96% by weight of zinc was used.

Next, the wire rods were drawn so that the core wire 10 for the core strand having an outer diameter of 0.185 mm, the side wire 11 for the core strand having an outer diameter of 0.185 mm, the core wire 17 for the side strand having an outer diameter of 0.185 mm, and the side wire 18 for the side strand having an outer diameter of 0.175 mm were produced. Besides, the deposit weight was 30 g/m$^2$ after the wire rod were drawn. Then, the strands were closed in such a manner as shown in FIG. 4 wherein the rope has a 7×7 construction, and the rope of example 1 having outer diameter of 1.5 mm was produced.

Comparative Example 1

The wire rods were produced in the same way as example 1 except that zinc-aluminum plating bath used in the example 1 was used for the wires for the core strand and the side strands. Further, the wire rods were drawn and stranded each other so that the rope having the 7×7 construction as a comparative example 1.

Comparative Example 2

The wire rods were produced by the same way as example 1 except that the conventional zinc plating bath was used for the wires for the core strand and the side strands. Further, the wire rods were drawn and stranded each other so that the rope having the 7×7 construction as a comparative example 2.

Besides, the plating weight was 30 g/m$^2$ after the wire rods were drawn.

Comparative Example 3

The wire rope disclosed in Japanese Examinee Utility Model Publication No. 25500/1979 wherein outer diameter in 1.5 mm and the wire rope has the 7×7 construction was bought as comparative example 3. The wire rope has zinc plating layer and tin layer.

The weight of the plating composed of the zinc plating layer and the tin plating layer was 30 g/m$^2$ (total weight of both layers). In the produced ropes of example 1 and comparative examples 1 to 3, the time to generate rust was confirmed by "salt spray test" (JIS Z 2371).

The result was shown in Table 1.

TABLE 1

|  | Example 1 | Com. Ex. 1 | Com. Ex. 2 | Com Ex. 3 |
| --- | --- | --- | --- | --- |
| Core strand |  |  |  |  |
| surface treatment | xinc plating | zinc-aluminum alloy plating | zinc plating | zinc plating |
| plating weight (g/m$^2$) | 30 | 30 | 30 | 15 |
| Side strand |  |  |  |  |
| surface treatment | zinc-aluminum alloy plating | zinc-aluminum alloy plating | zinc plating | zinc plating/ tin plating |
| plating weight (g/m$^2$) | 30 | 30 | 30 | 30 (total) |
| Time when red rust occurs* | 150 hours | 150 hours | 40 hours | 100 hours |

*In accordance with "salt spray test (JIS Z 2371)"

As shown in Table 1, the rope of example 1 wherein each wire of the core strand is plated with zinc and each wire of the side strand is plated with zinc-aluminum alloy has improved the corrosion resistance remarkably as compare with the rope of comparative example 2 wherein all the wires are plated with zinc or the rope of comparative example 3 having zinc plating layer and tin plating layer.

On the other hand, comparing with the rope of comparative example 1, the result was that the rope of example 1 has the same corrosion resistance as that of comparative example 1.

As mentioned hereinbefore, superior corrosion resistant steel wire is used for only the wires defining the outermost layer. Then, the cost for producing the rope is low as compared to the rope wherein the superior corrosion resistant steel wire is used for all the wires. Further, the rope can have the same corrosion resistance as that of the rope wherein the superior corrosion resistant steel wires is used for all the wires.

With respect to such a rope having a stranded construction, when the rope has for instance the 7×7 construction, the rope is firmly closed as compare with the conventional rope having 7×7 construction (tightening percentage is in the range of 0 to 2%) if the rope having 7×7 construction is closed with tightening percentage being in the range of 2.5 to 8%. A portion of the rope wherein the rope is bent with sliding motion, such as a fixed guide is not subjected to secondary bending, and endurance property is not reduced.

Especially, with respect to the rope having the 19+8×7 construction or (parallel lay strand)+8×7 construction, the rope has advantages as mentioned hereinbefore as compare with the conventional rope having the 19+8×7 construction (the tightening percentage is in the range of 0 to 2% and the preforming percentage is in the range of 95 to 100%) when the tightening percentage of the rope having the 19+8×7 construction or (parallel lay strand)+8×7 construction is in the range of 4 to 11% and the percentage is in the range 65 to 90% as mentioned hereinafter.

Next, a second aspect of the rope of the present invention wherein the rope has the stranded construction and the rope is closed with a specific tightening percentage and a specific preforming percentage is explained with reference to FIGS. 7 to 9. However, present invention is not limited to the ropes having such shapes shown in FIGS. 7 to 9. Further, the rope is not limited to either the rope using a superior corrosion resistant steel wire or the rope without using a superior corrosion resistant rope.

Figure 7:
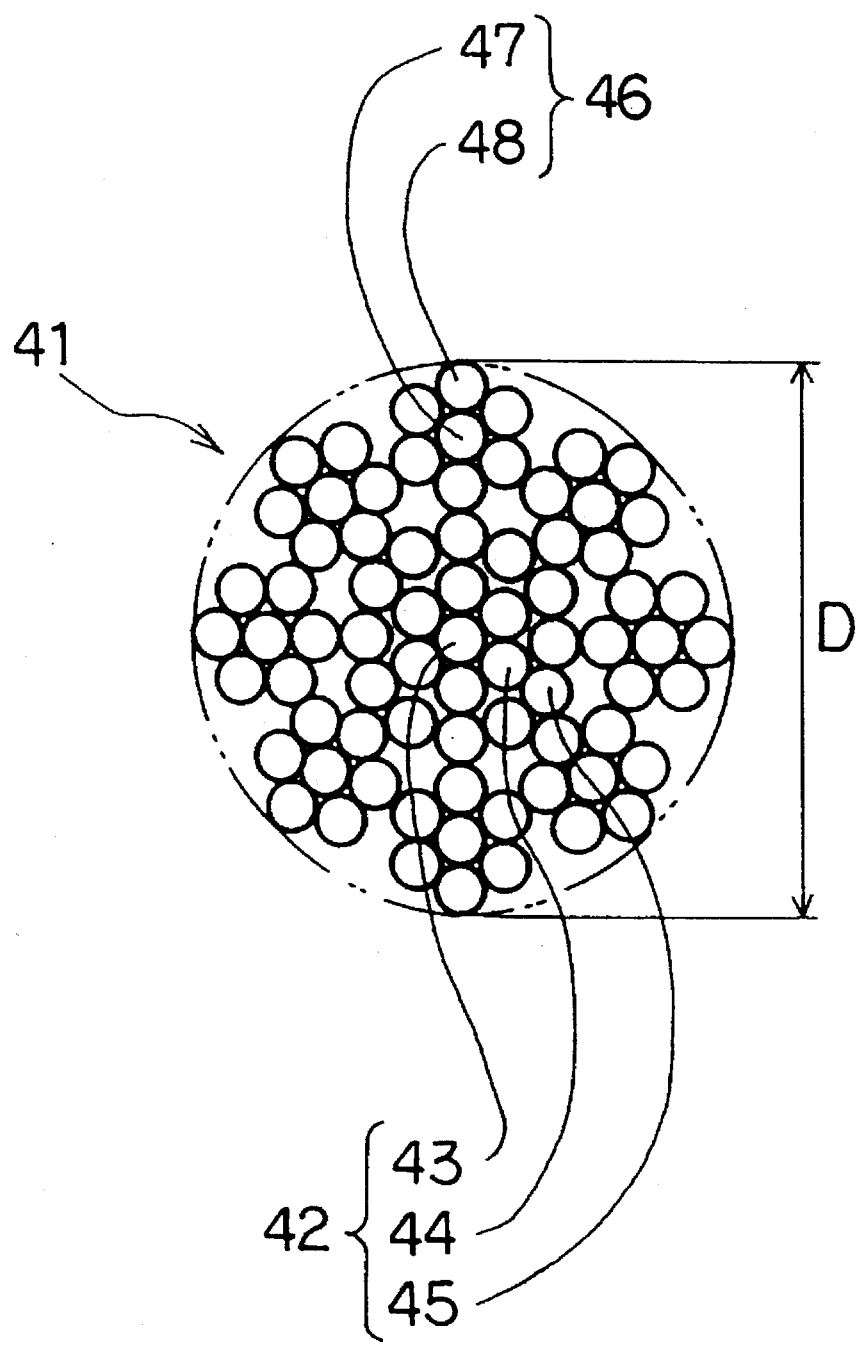
FIG. 7 is an explanatory drawing illustrating a tightening percentage of the rope and a sectional view of an embodiment of the rope of the second aspect in accordance with the present invention.

A rope shown in FIG. 7 has a so-called 19+8×7 construction which is the same as that of the rope shown in FIG. 5. That is, a core strand 42 is defined by stranding six first side wires 44 defining a first layer arranged around a single core wire 43 and stranding twelve second side wires 45 defining a second layer arranged around the first layer, and a side strand 46 is defined by stranding six side wires 48 arranged around a single core wire 47. The rope 41 having a stranded construction is obtained by dosing eight pieces of the side strands 46 arranged around the core strand 42.

Further, the tightening percentage of the rope 41 is in the range of 4 to 11% and the preforming percentage of the rope 41 is in the range of 65 to 90%.

The reason why the tightening percentage is in the range of 4 to 11% is that there is a problem in that it is difficult to close the rope when the tightening percentage is more than 11%, a breakage tends to happen or surface of the wire is sometimes damaged due to excessive closing when the rope is produced, while if the tightening percentage is less than 4%, the endurance property is insufficient when the rode is subjected to bending with sliding motion as clear from the example mentioned hereinafter.

On the other hand, the reason why the preforming percentage is in the range of 65 to 90% is that if the preforming percentage is more than 90%, a closing force in the direction of a center of the rope is not sufficiently applied to the side strand when the rope is used for the portion wherein the rope is bended with sliding such as a fixed guide so that the secondary bending of a wire tends to happen in the wire. Accordingly, the endurance property is lowered as clearly explained in the example and the comparative example mentioned hereinafter.

On the contrary, with respect to the rope wherein the preforming percentage is not more than 65%, the side strand becomes loose when the rope is cut. For that reason, the rope cannot be used.

Figure 8:
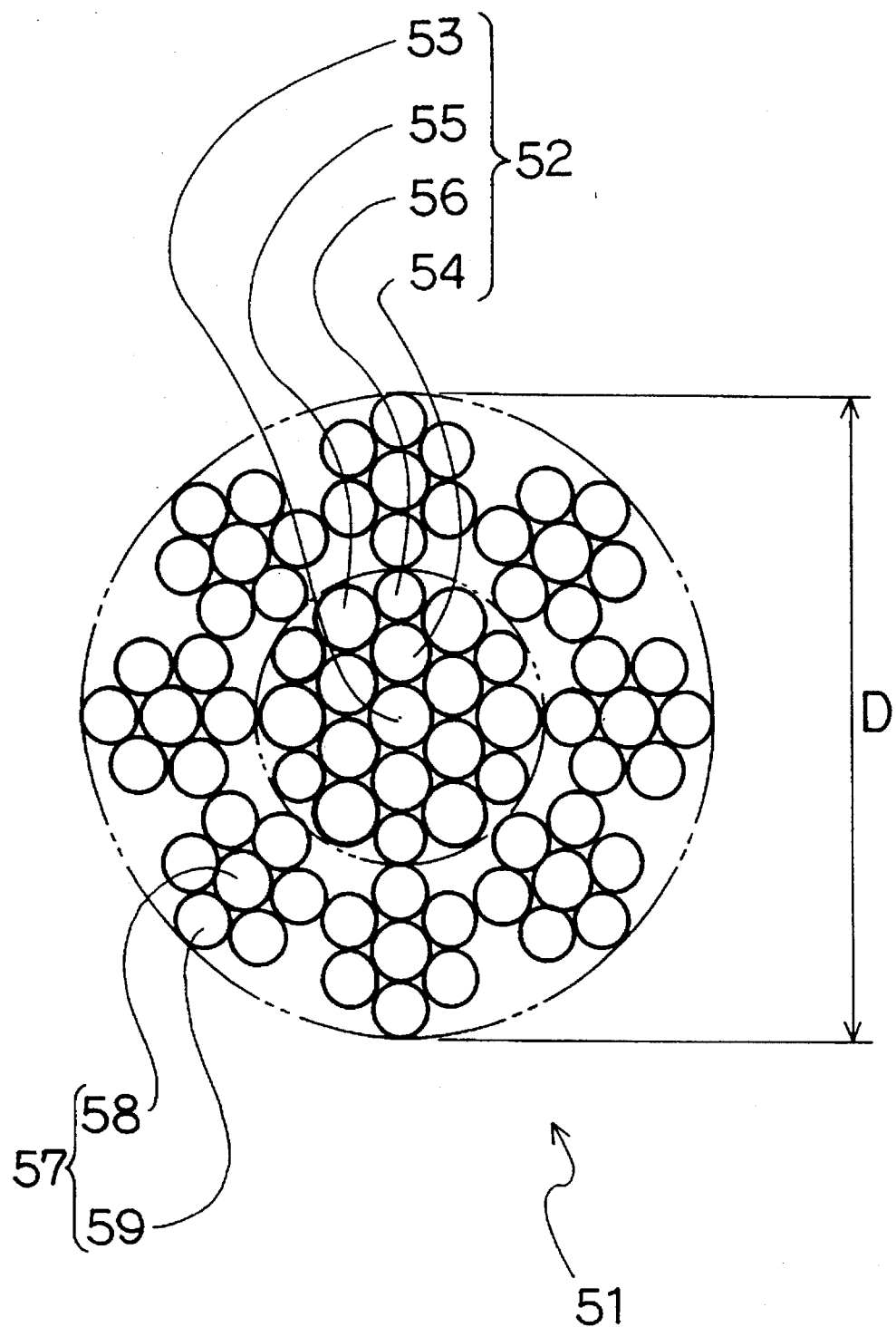
FIG. 8 is an explanatory drawing illustrating the tightening percentage of the rope and a sectional view of another embodiment of the rope of the second aspect in accordance with the present invention.

Next, a rope 51 shown in FIG. 8 is another example of the rope of the present invention which has the same Warrington type strand as that of the rope 27 (referring to FIG. 6) of the above-mentioned example.

That is, 6 pieces of first side wires 54 defining a first layer are arranged around a core wire 53 and a diameter of the first side wire 54 is somewhat smaller than that of the core wire 53. Each of 6 pieces of the third side wires 55 having the same diameter as that of the core wire 53 is arranged in the groove defined by the adjoining first side wires 54 and each of six pieces of second side wires 56 is arranged around the first layer in such a way as to be along with the first side wire 54. A diameter of the second side wire 56 is still smaller than that of the first side wire 54. Further, the above-mentioned side wires 54, 55, 56 are stranded at the same time in such a way as to be in the same pitch and in the same direction around the core wire 53. Thus, the core strand 52 is formed. Besides, diameter of each wire is not limited to the diameter mentioned hereinbefore. In short, diameter of each wire is suitably selected so that each wire can be linearly contacted each other when each wire is stranded in the same pitch and in the same direction.

Further, 8 pieces of side strands 57 are obtained by stranding 6 pieces of side wires 59 around a core wire 58.

Besides, in the rope 51, the tightening percentage is in the range of 4 to 11% and the preforming percentage is in the range of 65 to 90%.

Figure 9:
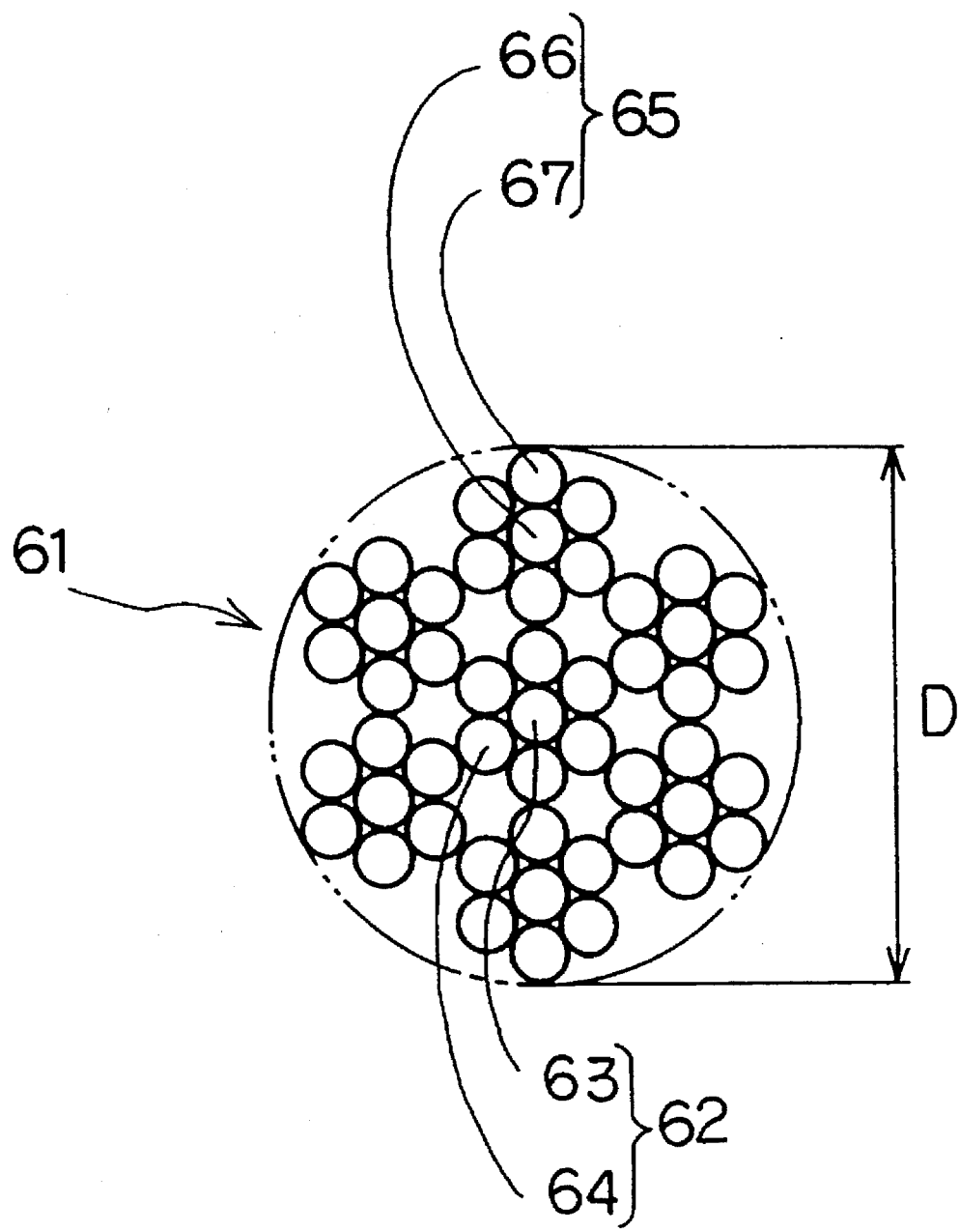
FIG. 9 is an explanatory drawing illustrating the tightening percentage of the rope and a sectional view of yet another embodiment, of the rope of the second aspect in accordance with the present invention.

Further, yet another example of the rope of the present invention is shown in FIG. 9. In a rope 61, the tightening percentage is in the range of 4 to 11% and the preforming percentage is in the range of 65 to 90%. The rope 61 has the same 7×7 construction as that of the rope 8, 15 shown in FIGS. 3 and 4.

That is, a core strand 62 is defined by stranding six side wires 64 arranged around a core wire 63, a side strand 65 is defined by stranding six side wires 67 arranged around a core wire 66, and a stranded rope is obtained by closing the six side strands 65 arranged around the core strand 62.

Next, the rope of the present invention is explained more particularly on the basis of examples.

EXAMPLE 2

(referring to FIG. 7)

The wire rod having an outer diameter of 0.93 mm was obtained by plating the steel wire (material: JIS G 3506 SWRH 2A) with zinc.

Next, the wire rod was drawn so that the core wire 43 of the core strand having an outer diameter of 0.170 mm, the first side wire 44 of the core strand having an outer diameter of 0.150 mm, the second side wire 45 of the core strand having an outer diameter of 0.150 mm, the core wire 47 of the side strand having an outer diameter of 0.150 mm, and the side wire 48 of the side strand having an outer diameter of 0.140 mm were produced.

The wires were stranded in the direction shown in Table 2, then the rope having the 19+8×7 construction was obtained. Besides, the measured outer diameter D of the wire was 1.550 mm as shown in example 2.

The calculated outer diameter of the rope was 1.630 min. Accordingly, the tightening percentage of the rope was 4.91%, and the wave diameter of the side strand was measured after loosing the rope so that the diameter was 1.25 mm, then the preforming percentage was 80.6%.

Besides, the rope having the above-mentioned tightening percentage and preforming percentage can not be obtained without adjusting a pressure, tension, and a degree of preforming which are applied to the rope in the producing step.

EXAMPLE 3

The rope of the example 3 was obtained by the same way as that of the example 2 except for the measured outer diameter and the tightening percentage of the rope, and the wave diameter and the preforming percentage of the strand as shown in Table 2.

EXAMPLE 4

The rope of the example 4 was obtained by the same way as that of the example 2 except for the measured outer diameter and the tightening percentage of the rope, and the wave diameter and the preforming percentage of the strand as shown in Table 2.

EXAMPLE 5

The rope of the example 4 was obtained by the same way as that of the example 2 except for the measured outer diameter and the tightening percentage of the rope, and the wave diameter and the preforming percentage of the strand as shown in Table 2.

EXAMPLE 6

The rope of the example 6 was obtained by the same way as that of the example 2 except that as the wire rod of the wire of the side strand, the wire having an outer diameter of 0.93 mm wherein the steel wire (material: JIS G 3506 SWRH 62A) was plated with zinc-aluminum alloy.

Besides, the zinc-aluminum plating was performed by hot dipping into the zinc plating bath containing 4% by weight of aluminum.

EXAMPLE 7

(referring to FIG. 8)

The wire rod having an outer diameter of 0.93 mm was obtained by plating the steel wire (material: JIS G 3506 SWRH 62A) with zinc.

Next, the wire rod was drawn so that the core wire 53 of the core strand having an outer diameter of 0.170 mm, the first side wire 54 of the core strand having outer diameter of 0.160 mm, the third side wire 55 of the core strand having an outer diameter of 0.170 mm, and the second side wire 56 of the core strand having an outer diameter of 0.130 mm, each of which is the wire defining the core strand 52, were produced.

The wire rod having an outer diameter of 0.93 mm was obtained by plating the steel wire (material: JIS G 3506 SWRH 62A) with zinc-aluminum alloy. Further, the wire rod was drawn so that the core wire 58 of the side strand having an outer diameter of 0.150 mm, the side wire 59 of the side strand having an outer diameter of 0.140 mm, each of which is the wire defining the side strand 57, were produced.

The above-mentioned wires were stranded in the direction as shown in Table 2 and the core strand 52 was formed to be a Warrington type strand, then the core strand 52 and the side strands 57 were dosed so that the rope 51 of the example 7 having W(19)+8×7 construction and having the measured diameter D of 1,500 mm was obtained.

Comparative Example 4

The rope of comparative example 4 was obtained by the same way as that of the example 2 except for the measured outer diameter and the tightening percentage of the rope, and the wave diameter and the preforming percentage of the side strand as shown in Table 2.

Comparative Example 5

The rope of the comparative example 5 was obtained by the same way as that of the example 2 except for the wave diameter and the preforming percentage of the side strand as shown in Table 2.

Comparative Example 6

The rope of the comparative example 6 was obtained by the same way as that of the example 6 except for the wave diameter and the preforming percentage of the side strand as shown in Table 2.

Besides, the tightening percentage (%) of each rope of the examples 2 to 6 and the comparative examples 4 to 6 were obtained by the formula (1), and the percentage (%) of the rope of the example 7 was obtained by the formula (2).

Further, the preforming percentage (%) of the examples 2 to 7 and the comparative examples 4 to 6 were obtained by the formula (3).

the air cylinder generates a stall force of 35 kgf for 0.5 sec. Thereafter the air cylinder moves in the direction F. Besides, the stroke of the rope was 100 mm and period was 20 strokes/min. Further, a sufficient amount of an olefinic grease is applied to the roller 72a, 72b in the portion wherein the rope 41 is contacted with.

TABLE 2

|  | Ex. 2 | Ex. 3 | Ex. 4 | Ex. 5 | Ex. 6 | Ex. 7 | Com. Ex. 4 | Com. Ex. 5 | Com. Ex. 6 |
|---|---|---|---|---|---|---|---|---|---|
| Core strand | | | | | | | | | |
| outer diameter (a) of the core wire (mm) | 0.170 | 0.170 | 0.170 | 0.170 | 0.170 | 0.170 | 0.170 | 0.170 | 0.170 |
| outer diameter ($b_1$) of the first side wire (mm) | 0.150 | 0.150 | 0.150 | 0.150 | 0.150 | 0.160 | 0.150 | 0.150 | 0.150 |
| stranding direction | Z*1 | Z | Z | Z | Z | Z | Z | Z | Z |
| outer diameter ($b_2$) of the second side wire (mm) | 0.150 | 0.150 | 0.150 | 0.150 | 0.150 | 0.130 | 0.150 | 0.150 | 0.150 |
| outer diameter ($b_3$) of the third side wire (mm) | — | — | — | — | — | 0.170 | — | — | — |
| stranding direction | Z | Z | Z | Z | Z | Z | Z | Z | Z |
| plating | zinc | zinc | zinc | zinc | zinc | zinc | zinc | zinc | zinc |
| Side strand | | | | | | | | | |
| outer diameter (c) of the core wire (mm) | 0.150 | 0.150 | 0.150 | 0.150 | 0.150 | 0.150 | 0.150 | 0.150 | 0.150 |
| outer diameter (d) of | 0.140 | 0.140 | 0.140 | 0.140 | 0.140 | 0.140 | 0.140 | 0.140 | 0.140 |
| stranding direction | S*2 | S | S | S | S | S | S | S | S |
| plating | zinc | zinc | zinc | zinc | zinc-aluminum | zinc-aluminim | zinc | zinc | zinc-aluminum |
| Rope | | | | | | | | | |
| Calculated outer diameter (mm) $2 + 2b_1 + 2b_2 + 2c + 4c$ | 1.630 | 1.630 | 1.630 | 1.630 | 1.630 | 1.620 | 1.630 | 1.630 | 1.630 |
| measured outer diameter (mm) | 1.550 | 1.485 | 1.500 | 1.530 | 1.550 | 1.500 | 1.600 | 1.550 | 1.550 |
| wave diameter of the side strand (mm) | 1.25 | 1.26 | 1.08 | 1.10 | 1.25 | 1.10 | 1.30 | 1.48 | 1.48 |
| Closing direction | Z | Z | Z | Z | Z | Z | Z | Z | Z |
| tightening percentage (%) | 4.91 | 8.90 | 7.98 | 6.13 | 4.91 | 7.41 | 1.84 | 4.91 | 4.91 |
| performing percentage (%) | 80.6 | 84.8 | 72.0 | 71.9 | 80.6 | 73.3 | 81.3 | 95.5 | 95.5 |

*1 Z means a right hand lay
*2 S means a left hand lay

Next, the bending fatigue test by using rollers and the bending fatigue rest by using a fixed guide were performed to the examples 2 to 7 and comparative examples 4 to 6 which were obtained as mentioned hereinbefore.

The bending fatigue tests, in which the test method uses a pair of rollers, are conducted in the manner as hereinafter described.

Figure 10:
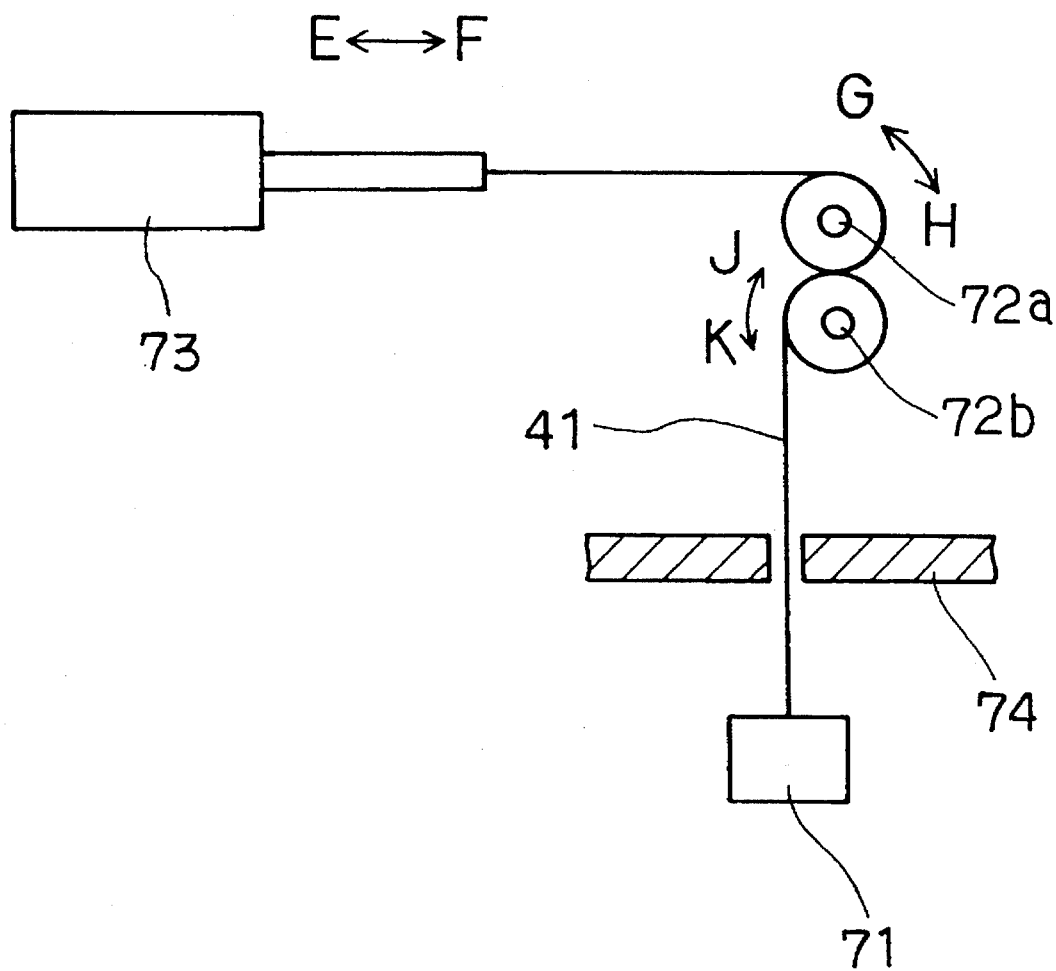
FIG. 10 is an explanatory drawing of an apparatus for measuring a durability on bending fatigue of the top in which rollers are used.

As shown in FIG. 10, the rope 41, 51 (hereinafter numeral 41 is represented for the rope) in which overall length was 1000 mm was provided with a weight 71 of 10 kg at one end. Then, the rope 41 was arranged so as to be turned by 90 degree by a roller 72b, then turned by 180 degree by another roller 72a. Further, the other end of the rope 41 was connected with a piston rod of an air cylinder 73.

When the air cylinder 73 reciprocates in the direction of arrow E and arrow F, the roller 72a rotates in the direction of arrow G and arrow H and the roller 72b rotates in the direction of arrow J and arrow K. Besides, the air cylinder 73 moves in the direction of arrow E firstly, then the weight 71 is lifted upwardly and abuts against a stopper 74 thereby, FIG. 11 represents an elevation (FIG. 11(A)) and a side elevation (FIG. 11(B)) of the roller 72a, 72b. A grooved-track diameter L of the roller 72a, 72b is 30 mm and material thereof is nylon 6.

FIG. 12 is a partially enlarged sectional representation.

An inner radius R1 of the grooved track is 1.0 mm, and a angle θ formed with internal side surface of the groove each other is 30 degree. The rope 41 for the test was reciprocated for 20,000 cycles.

(test method using a fixed guide)

Figure 13:
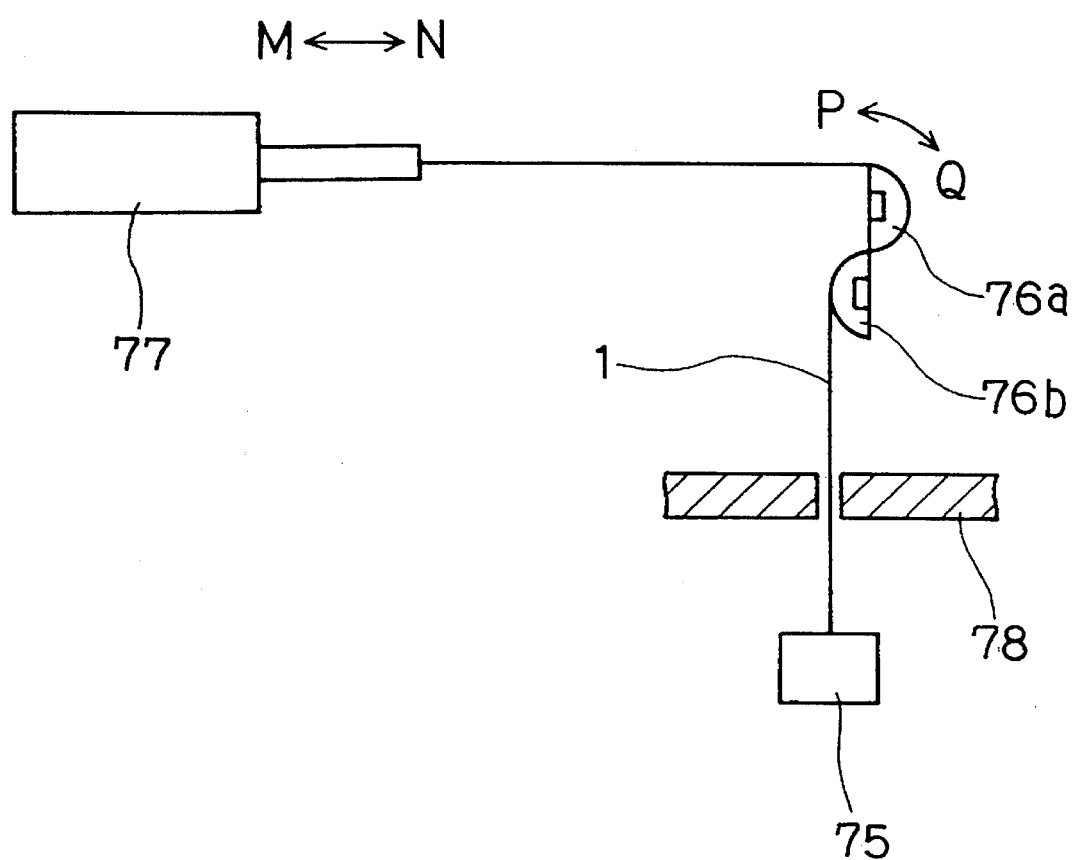
FIG. 13 is an explanatory drawing of an apparatus for measuring a durability on bending fatigue of the rope by using fixed guides when the rope is subjected to bending in a state of sliding motion.

As shown in FIG. 13, the rope 41 in which overall length was 1000 mm was provided with a weight 75 of 10 kg at one end. Then, the rope 41 was arranged so as to be turned by 90 degree by a fixed guide 76b, then turned by 180 degree by another fixed guide 76a. Further, the other end of the rope 41 was connected with a piston rod of an air cylinder 77.

When the air cylinder 77 reciprocates in the direction of arrow M and arrow N, the rope 41 is slided on the fixed guide in the direction of arrow P and arrow Q. Besides, the air cylinder 77 moves in the direction of arrow M firstly, then the weight 75 is lifted upwardly and hits a stopper 78. Thereby, the air cylinder generates a stall force of 35 kgf for 0.5 sec. Thereafter the air cylinder 77 moves in the direction N. Besides, the stroking length of the rope was 100 mm and the reversal speed was 20 cycles per minute. Further, a sufficient amount of a defining grease was applied to in the fixed guide 76a, 76b the portion wherein the rope 41 is contacted with.

Figure 14A:
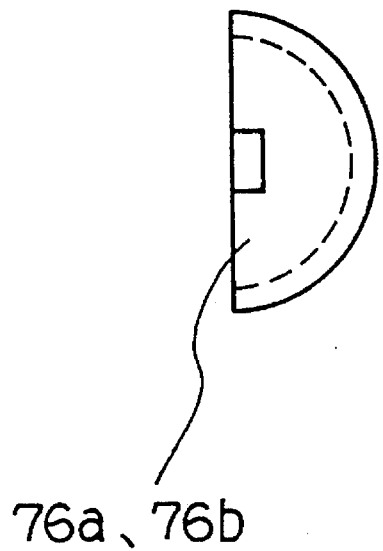
FIGS. 14(A) and 14(B) are explanatory drawing of the fixed and guides which are used in the apparatus of FIG. 13.
Figure 14B:
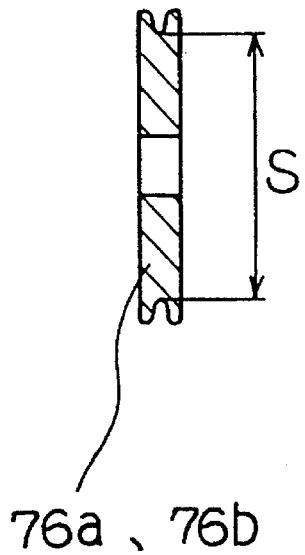

FIG. 14 represents an elevation (FIG. 14 (A)) and a side elevation (FIG. 14 (B)) of the fixed guide 76a, 76b. A core diameter S of the fixed guide 76a, 76b is 30 mm and material thereof is nylon 6.

Figure 15:
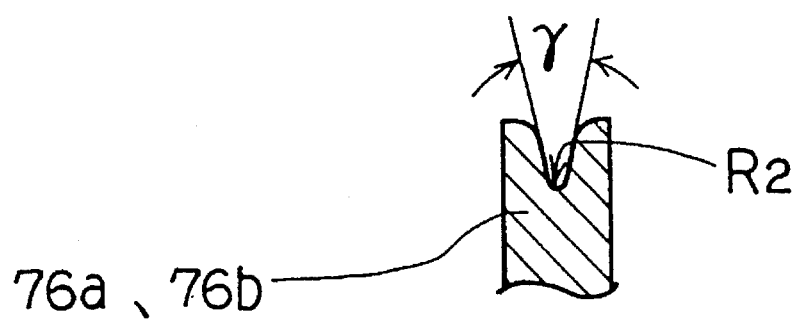
FIG. 15 is an explanatory drawing of the fixed guides which are used in the apparatus of FIG. 14.
Figure 16A:
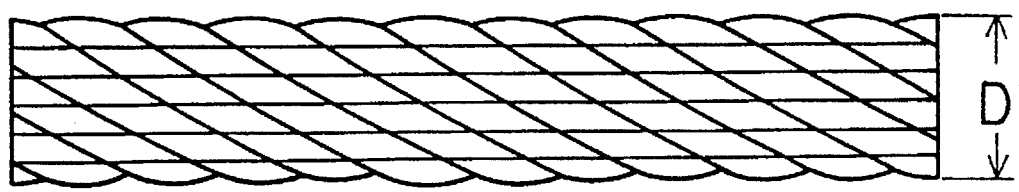
FIGS. 16(A) and 16(B) are explanatory drawings illustrating a preforming percentage of the rope.
Figure 16B:
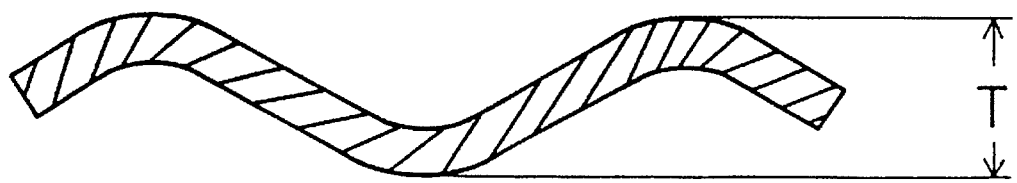

FIG. 15 is a partially enlarged sectional representation. An inner radius R2 of the grooved track is 1.0 mm, and a gash angle γ is 30 degree. The rope 41 for the test was reciprocated for 20000 cycles. Further, the test to confirm the breakage of the wire, was continued until the rope 41 was broke, then the number of the cycles at the break was recorded.

The results of the bending fatigue test in examples 2 to 7 and comparative examples 4 to 6 are shown in Table 3.

TABLE 3

|  | bending fatigue test by a pare of rollers | | bending fatigue test by a fixed guide | | |
| --- | --- | --- | --- | --- | --- |
|  | number of cycles | number of broken wires | number of cycles | number of broken wires | number of cycles when the rope was broken |
| Ex. 2 | 20000 | 0 | 20000 | 0 | 72000 |
| Ex. 3 | 20000 | 0 | 20000 | 0 | 69000 |
| Ex. 4 | 20000 | 0 | 20000 | 0 | 132000 |
| Ex. 5 | 20000 | 0 | 20000 | 0 | 127000 |
| Ex. 6 | 20000 | 0 | 20000 | 0 | 70000 |
| Ex. 7 | 20000 | 0 | 20000 | 0 | 186000 |
| Com. Ex. 4 | 20000 | 0 | 20000 | 63 | 25000 |
| Com. Ex. 5 | 20000 | 0 | 20000 | 18 | 31000 |
| Com. Ex. 6 | 20000 | 0 | 20000 | 17 | 31000 |

According to the test results shown in Table 3, breakage was not found in the examples 2 to 7 and the comparative examples 4 to 6 on the bending fatigue test by a pair rollers at 20000 cycles. However, on the test by a fixed guide, 63 pieces of the wires were broken at 20000 cycles in the comparative example 4. In the comparative example 5, 18 pieces of the wires were broken and in the comparative example 6, 17 pieces of the wire were broken at 20000 cycles. On the contrary, any breakage of a wire was not found in the examples 2 to 7 after the bending fatigue test was repeated 20000 cycles.

Further, the bending fatigue test was repeated until the rope was broken so that the rope was broken at 25000 cycles in the comparative example 4 and the rope was broken at 31000 cycles in the comparative examples 5 and 6. On the contrary, it was found that the durability of the examples 2, 3, and 6 were more than two times as much as that of the comparative examples 4 to 6, the durability of the examples 4 and 5 were more than 4 times as much as that of the comparative examples 4 to 6, and the durability of the example 7 was more than 6 times as much as that of the comparative examples 4 to 6.

In the bending fatigue test using a pair of rollers, in other words, under the condition where the wire is subjected to only bending, there is not significant difference in the examples 2 to 7 and the comparative examples 4 to 6. However, there is a remarkable difference in the durability when the rope is bent while the rope is slid on the guide.

Accordingly, the rope wherein the rope is closed such that the tightening percentage is in the range of 4 to 11% and the preforming precentage is in terms of range of 65 to 90% is superior in the durability.

On the other hand, comparing the example 2 with the example 6, even if the wire of the side strand is plated with zinc-aluminum alloy instead of zinc, the durability was improved (i.e. there is no difference in the durability between the wires of the side strand applied to the normal zinc plating and superior corrosion resistant plating).

Besides, the examples 2 to 7 having 19+8×7 construction or W(19)+8×7 construction has the same characteristic. However, it is natural that the rope having, for instance, 7×7 construction using large-diameter-wire or 7×19 construction has the same effect.

The rope of the present invention, wherein the steel wire having superior corrosion resistance is used for the outermost wires can be endurable to corrosion for a long time even under the circumstance wherein salt water is added to the wire for instance.

Furthermore, the superior corrosion resistant steel wire should be used only for the outermost wire. For that reason, the cost for producing the wire is lower than that of the wire wherein the superior corrosion resistant steel is used for all the wires.

Further, even in the case that the superior corrosion resistant steel wires having an usual durability on bending are arranged in the outer layer of the rope, the rope having superior durability for bending superior and corrosion resistance can be obtained when the steel wires having superior durability for bending are arranged in the inner layer of the rope.

In the rope of the present invention wherein the tightening percentage is in the range of 4 to 11% and the preforming percentage is in the range of 65 to 90%, the fatigue durability on bending is not lowered even if the rope is used in the portion, such as a guide wherein the rope is bent with sliding thereon. Therefore, for instance, the rope is preferably used for the control cable for the window regulator of the automobile.

Though several embodiments of the present invention described above, it is to be understood that the present invention is not limited to the above-mentioned embodiments, and various changes and modifications may be made in the invention without departing from the spirit and scope thereof.

What is claimed is:

1. A rope, comprising a plurality of wires made of a steel wire being twisted together, wherein at least said wires which are arranged in such a manner as to be disposed on an outer surface of the rope are made of a steel wire and have corrosion resistance, wherein at least said wire which is located in a center of the rope is made of a wire having corrosion resistance, and wherein the corrosion resistance of said wires disposed on said outer surface of the rope is higher than the corrosion resistance of said wire located in the center of the rope, wherein said plurality of wires disposed on said outer surface of the rope is arranged so as to have a predetermined range of tightening percentage, said tightening percentage being defined as:

$$\text{tightening percentage} = \frac{\text{calculated diameter of a rope} - \text{measured diameter of a rope}}{\text{calculated diameter of a rope}} \times 100,$$

wherein said plurality of wires disposed on said outer surface of the rope is arranged so as to have a predetermined range of preforming percentage, said preforming percentage being defined as:

$$\phi = \frac{T}{D} \times 100\ (\%),$$

wherein

D: measured outer diameter of a rope, and

T: wave diameter when the wire is loosed, and wherein said predetermined range of tightening percentage is between 4 and 11%, and wherein said predetermined range of preforming percentage is between 65 and 90%.

2. A rope of claim 1, wherein the rope has a 19+8×7 construction.

3. A rope of claim 1, wherein a core strand of the rope has a parallel lay construction.

4. A rope for operating of claim 3, wherein strands of the rope has a parallel lay strand with an 8×7 construction.

5. A rope for claim 1, wherein the wire disposed on the outer surface of rope is plated with zinc-aluminum alloy, the wire which is not disposed on the outer surface of the rope is plated with zinc.

6. A rope, comprising a plurality of wire strands, wherein the plurality of wire strands are closed in an abutting relationship, and a tightening percentage thereof is in the range of between 4 and 11% and a preforming percentage thereof is in the range of between 65 and 90%, wherein said plurality of wires disposed on said outer surface of the rope is arranged so as to have a predetermined range of tightening percentage, said tightening percentage being defined as:

$$\text{tightening percentage} = \frac{\text{calculated diameter of a rope} - \text{measured diameter of a rope}}{\text{calculated diameter of a rope}} \times 100,$$

and wherein said plurality of wires disposed on said outer surface of the rope is arranged so as to have a predetermined range of preforming percentage, said preforming percentage being defined as:

$$\phi = \frac{T}{D} \times 100\ (\%),$$

wherein

D: measured outer diameter of a rope, and

T: wave diameter when the wire is loosed.

7. A rope of claim 6, wherein the strands are closed to have a 19+8×7 construction.

8. A rope of claim 6, wherein the wires of the core strand are stranded to have a parallel lay construction.

9. A rope of claim 8, wherein the strands of the rope has a parallel lay strand with an 8×7 construction.

10. A rope of claim 6, wherein the superior corrosion resistance steel wire is used for the side strands.

11. A rope of claim 6, wherein the wire plated with zinc-aluminum alloy is used for the side strand.

12. A rope, comprising a plurality of wires made of a steel wire being twisted together, wherein at least said wires which are arranged in such a manner as to be disposed on an outer surface of the rope are made of a steel wire and have corrosion resistance, wherein at least said wire which is located in a center of the rope is made of a wire having corrosion resistance, and wherein the corrosion resistance of said wires disposed on said outer surface of the rope is higher than the corrosion resistance of said wire located in the center of the rope, wherein said plurality of wires disposed on said outer surface of the rope is arranged so as to have a predetermined range of preforming percentage, said preforming percentage being defined as:

$$\phi = \frac{T}{D} \times 100\ (\%),$$

wherein

D: measured outer diameter of a rope, and

T: wave diameter when the wire is loosed, and wherein said predetermined range of preforming percentage is between 65 and 90%.

13. A rope of claim 12, wherein the rope is a spiral rope.

14. A rope of claim 12, wherein the rope is a stranded rope.

15. A rope of claim 12, wherein the rope has a 7×7 construction, and a tightening percentage which is in the range of between 2.5 and 8%.

* * * * *